United States Patent

[11] 3,601,847

[72] Inventors Shalygin Veniamin Nikolaevich
ulitsa Uritskozo; 10a kv. 53, Dzerzhinsk;
Stanislav Valerievich Yablonsky, ulitsa
Pravo-Bulachnayn 27, kv. 12, Kazan; Peter
Stepanovich Voloshin, ulitsa Pravdy, 6, kv.
99, Dzerzhinsk, all of, U.S.S.R.
[21] Appl. No. 869,512
[22] Filed Oct. 27, 1969
[45] Patented Aug. 31, 1971
[32] Priority Oct. 28, 1968
[33] U.S.S.R.
[31] 1281113

[54] DEVICE FOR GRANULATING MELTS
2 Claims, 2 Drawing Figs.

[52] U.S. Cl. ..................................... 18/2.6,
264/8, 264/13, 18/2.7
[51] Int. Cl. .................................................. B29c 5/04,
B29c 23/00, B22d 23/08

[50] Field of Search............................................. 18/2.4, 2.5
RR, 2.6, 2.7; 264/8, 13

[56] References Cited
UNITED STATES PATENTS

| | | | |
|---|---|---|---|
| 3,231,639 | 1/1966 | Mabra......................... | 18/2.5 RR X |
| 3,265,483 | 8/1966 | Garrison et al. ............. | 18/2.5 RR UX |
| 3,461,489 | 8/1969 | Tuttle............................ | 18/2.6 |
| 3,487,502 | 1/1970 | Becker et al.................. | 18/2.6 |

Primary Examiner—J. Spencer Overholser
Assistant Examiner—R. L. Spicer, Jr.
Attorney—Waters, Roditi, Schwartz & Nissen ABSTRACT: A device for granulating melts including a chamber with perforated lateral walls provided with a drive for rotating said chamber about its vertical axis and a stationary compartment with a perforated bottom mounted near the bottom of said chamber with perforated lateral walls in coaxial relationship with said chamber.

DEVICE FOR GRANULATING MELTS

The present invention relates to plants for use in the chemical industry and more particularly to devices for granulating melts. This device is best used for granulating melts of ammonia nitre and carbamide.

There is known in the art a device for spraying melts (U.S. Pat. No. 3,083,406) comprising a chamber with perforated lateral walls equipped with a drive for rotating the chamber about a vertical axis and with a branch pipe for supplying a melt into the chamber.

The known device for granulating melts is secured on the upper structure of a granulating tower. When the chamber is rotated, the melt supplied thereto through the branch pipe under the action of centrifugal force flows from the openings in the lateral walls in the form of a plurality of sprays. These sprays then decompose into separate drops which solidify during their free fall in a countercurrent flow of cooling air fed through the granulating tower and are collected on the bottom of the tower in the form of spherical granules.

In the known device the drops of the melt are thrown to the peripheral portion of the granulating tower by inertia. The central portion of the granulating tower is not irrigated with drops of the melt so that the inner space and the area of its base are used inefficiently, while the countercurrent flow of cooling air is also not used to the full extent.

These disadvantages lead to high energy losses during the operation of the granulating device and increase the cost of the produced granulated product.

An object of the present invention is to eliminate the above-mentioned disadvantages.

The specific object of the invention is to provide a device for granulating melts which has a simple construction and provides for uniform and complete irrigation of the inner space of the granulating tower and the area of its base.

This object is achieved by providing a device for granulating melts comprising a chamber with perforated lateral walls provided with a drive for rotating the chamber about its vertical axis and a branch pipe for supplying a melt into the chamber. According to the invention the device is equipped with a stationary compartment mounted at the bottom thereof in coaxial relationship with said chamber, said compartment having a perforated bottom and a branch pipe for supplying the melt into the compartment.

The chamber having the perforated lateral walls is preferably ring shaped, while the stationary compartment is preferably disposed within the free central space formed by the inner wall of the ring-shaped chamber.

The specific features of the invention will appear more fully hereinafter from a consideration of the following description taken in connection with accompanying drawings wherein one embodiment of the invention is illustrated by way of example.

Further objects and advantages of the invention will be apparent from the following detailed description of one particular embodiment thereof, reference being had to the accompanying drawings wherein a preferred form of the invention is clearly shown.

Figure 1:
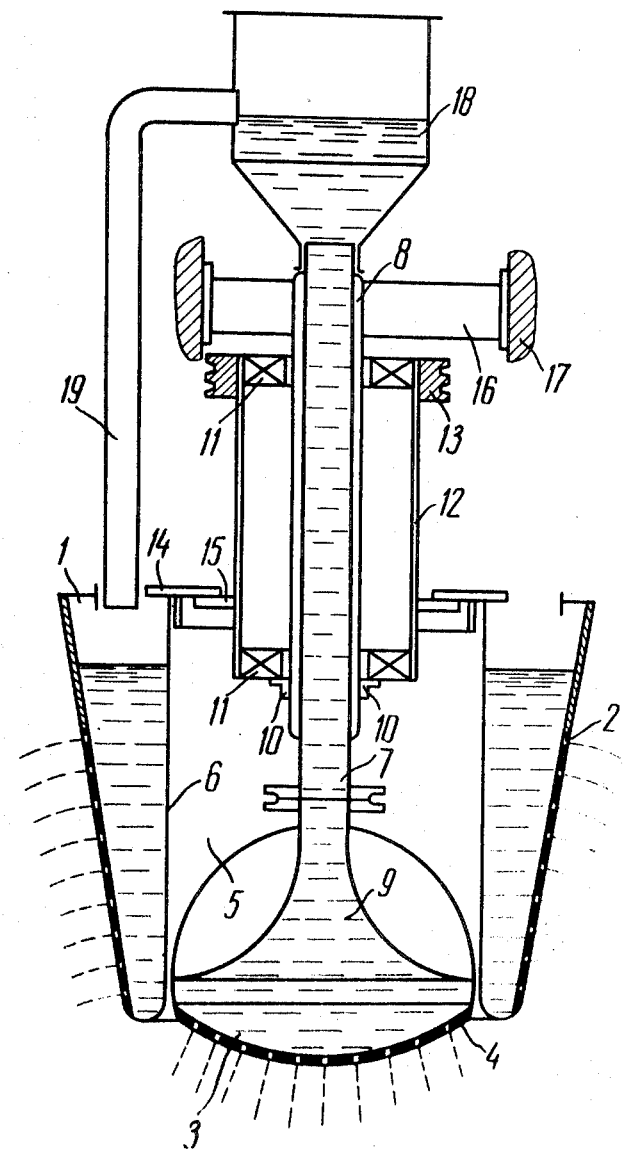
FIG. 1 is a device for granulating melts according to the invention.

The device for granulating melts comprises a chamber 1 (FIG. 1) with an outer perforated wall 2 and a stationary compartment 3 having a perforated bottom 4 mounted axially to the chamber 1.

The chamber 1 may be ring-shaped. Passing through the free central space 5 of the chamber 1 formed by the inner wall 6 is a tube 7 provided with a heating jacket 8 and connected with a branch pipe 9 for supplying the melt into the chamber 3. Secured on the tube 7 by means of brackets 10 and bearings 11 is a sleeve 12 with a pulley 13 associated with a drive for rotation of the chamber 1 (the drive is not shown in the drawing).

The chamber 1 is secured to the lower end of the sleeve 12 through a ring 14 and brackets 15. The tube 7 of the device is mounted in the upper structure 16 of the granulating tower 17 and is connected to a pressure tank 18.

The device operates as follows.

The melt from the pressure tank 18 is fed into the chamber 1 through the tube 7 and the branch pipe 19.

Figure 2:
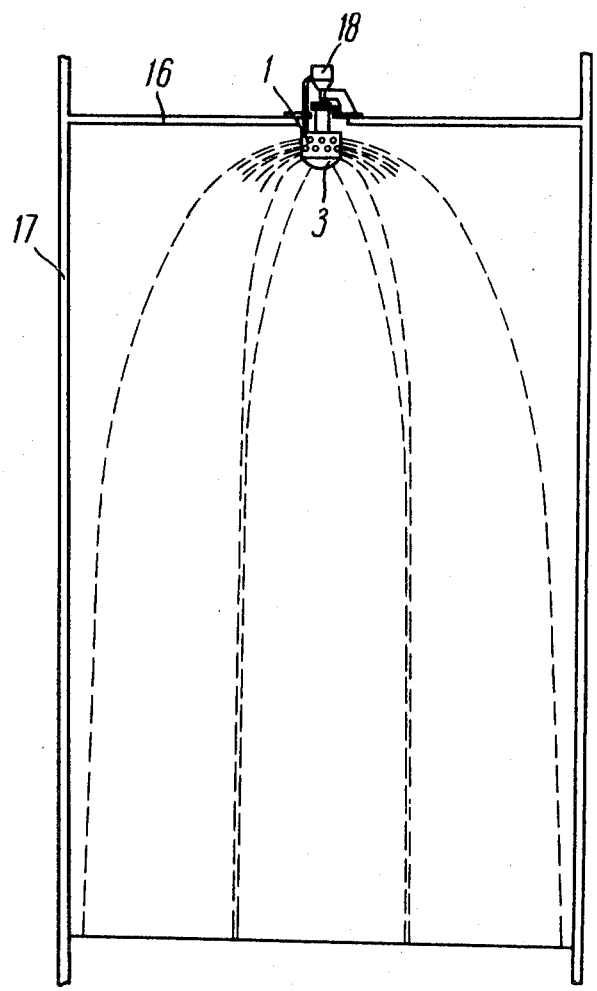
FIG. 2 is a diagram of the distribution of sprays of a melt throughout a section of the granulating tower during their free fall, according to the invention.

During the rotation of the chamber 1 the sprays of the melt flowing therefrom dissipate within the peripheral zone of the granulating tower 17 (see FIG. 2) and the ready granules are distributed throughout the annular zone of its base.

The sprays of the melt flowing form the openings in the bottom 4 (FIG. 1) of the stationary compartment 3 are distributed throughout the central annular zone of the base.

Thus, the use of the proposed device for granulating melts makes it possible to ensure uniform and complete irrigation of the whole granulating tower, and this is especially important for cylindrical granulating towers, since in this case, the countercurrent flow of cooling air is used most efficiently and the investment and energy consumption for the manufacture of a granulated product are considerably reduced.

We claim:

1. A device for granulating melts comprising in combination: a chamber with perforated lateral walls, a drive for rotating said chamber about its vertical axis, a branch pipe for supplying a melt into said chamber, a stationary compartment with a perforated bottom mounted coaxially with respect to said chamber with perforated lateral walls near its bottom, a branch pipe for supplying the melt into said stationary compartment.

2. A device as claimed in claim 1, wherein said chamber with perforated lateral walls is ring-shaped and said branch pipe for supplying the melt into said stationary compartment passes through the free central space formed by the inner walls of said ring-shaped chamber.